(12) United States Patent
Lee et al.

(10) Patent No.: US 9,451,236 B2
(45) Date of Patent: Sep. 20, 2016

(54) APPARATUS FOR SYNTHESIZING THREE-DIMENSIONAL IMAGES TO VISUALIZE SURROUNDINGS OF VEHICLE AND METHOD THEREOF

(75) Inventors: Jun-Seok Lee, Gyeongsangbuk-do (KR); Byung-Chan Jeon, Gyeongsangbuk-do (KR); Gyu-Ro Park, Gyeongsangbuk-do (KR); Sang-Jin Ryu, Gyeongsangbuk-do (KR); Byeong-Moon Song, Gyeongsangbuk-do (KR)

(73) Assignee: VADAS, LTD., Pohang-si, Gyeongsangbuk-do (KR)

( * ) Notice: Subject to any disclaimer, the term of this patent is extended or adjusted under 35 U.S.C. 154(b) by 484 days.

(21) Appl. No.: 14/127,757

(22) PCT Filed: Jun. 23, 2011

(86) PCT No.: PCT/KR2011/004598
§ 371 (c)(1),
(2), (4) Date: Dec. 19, 2013

(87) PCT Pub. No.: WO2012/176945
PCT Pub. Date: Dec. 27, 2012

(65) Prior Publication Data
US 2014/0125774 A1    May 8, 2014

(30) Foreign Application Priority Data
Jun. 21, 2011  (KR) .................. 10-2011-0060305

(51) Int. Cl.
| H04N 7/18 | (2006.01) |
| H04N 15/00 | (2006.01) |
| H04N 13/02 | (2006.01) |
| G06T 3/40 | (2006.01) |
| G06T 15/20 | (2011.01) |
| H04N 5/217 | (2011.01) |

(52) U.S. Cl.
CPC ............ *H04N 13/02* (2013.01); *G06T 3/4038* (2013.01); *G06T 15/205* (2013.01); *H04N 5/217* (2013.01)

(58) Field of Classification Search
CPC .. H04N 13/02; H04N 15/217; G06T 3/2038; G06T 15/205
USPC ................................................... 348/47, 148
See application file for complete search history.

(56) References Cited

U.S. PATENT DOCUMENTS

| 4,513,374 A | * | 4/1985 | Hooks, Jr. ............... G06T 15/10 365/230.04 |
| 5,764,786 A | * | 6/1998 | Kuwashima ........... G01B 11/00 348/E5.042 |

(Continued)

FOREIGN PATENT DOCUMENTS

| JP | 11-212641 A | 8/1999 |
| KR | 10-1995-0020274 A | 7/1995 |

(Continued)

*Primary Examiner* — Michael Lee
(74) *Attorney, Agent, or Firm* — Rabin & Berdo, P.C.

(57) ABSTRACT

The present invention relates to three-dimensional visualization of the surrounding images of a vehicle, and comprises the steps of: enabling a plurality of wide angle cameras provided at a vehicle to receive a plurality of photographed images for reference patterns formed on the ground; extracting feature points from the photographed reference patterns and estimating a relative location and an installation angle of each camera using the known physical location information of the extracted feature points; obtaining optical parameters comprising an optical center of a lens for correcting lens distortion using the photographed images and mapping each image on a surface of a Gaussian sphere using the obtained optical center; changing an angle and distance such that the Gaussian sphere and the real reference patterns correspond to each other using the relative location and the installation angle of the estimated camera and arranging the images in a three-dimensional virtual space; and obtaining a three-dimensional single image by mapping each image arranged in the three-dimensional virtual space to an inner surface of the three-dimensional sphere corresponding to one large sphere.

16 Claims, 10 Drawing Sheets

(56) References Cited

U.S. PATENT DOCUMENTS

| | | | |
|---|---|---|---|
| 6,173,222 B1 | 1/2001 | Seo et al. | |
| 2010/0194886 A1* | 8/2010 | Asari | G06T 7/002 |
| | | | 348/148 |
| 2012/0287232 A1* | 11/2012 | Natroshvili | G06T 7/0028 |
| | | | 348/36 |

FOREIGN PATENT DOCUMENTS

| | | |
|---|---|---|
| KR | 10-2007-0061157 A | 6/2007 |
| KR | 10-2011-0009547 A | 1/2011 |

* cited by examiner

| coordinate | n-th camera |||||
|---|---|---|---|---|---|
| | $X_1$ | $X_2$ | $X_3$ | ... | $X_m$ |
| $Y_1$ | $T_{11}$ | $T_{21}$ | $T_{31}$ | ... | $T_{m1}$ |
| $Y_2$ | $T_{12}$ | $T_{22}$ | $T_{32}$ | ... | $T_{m2}$ |
| $Y_3$ | $T_{13}$ | $T_{23}$ | $T_{33}$ | ... | $T_{m3}$ |
| ... | ... | ... | ... | ... | ... |
| $Y_n$ | $T_{1n}$ | $T_{2n}$ | $T_{3n}$ | ... | $T_{mn}$ |

FIG. 12

APPARATUS FOR SYNTHESIZING THREE-DIMENSIONAL IMAGES TO VISUALIZE SURROUNDINGS OF VEHICLE AND METHOD THEREOF

TECHNICAL FIELD

The present invention relates to a multichannel image-based driver assistance system and, more particularly, to an apparatus and method for synthesizing 3D images for the purpose of visualizing the surroundings of a vehicle, which visualize images of the surroundings of a vehicle photographed using a plurality of cameras in the form of a three-dimensional (3D) image, thereby being able to enhance reality.

BACKGROUND ART

As a method of visualizing the surroundings of a vehicle that belongs to currently known apparatuses, there is a top view system based on multichannel image synthesis. This is used to synthesize images of the surroundings of a vehicle that represent blind zones that are present out of the field of view of a driver. The top view output apparatus outputs a plurality of images obtained via cameras installed in front of, in back of, on the left of and on the right of a vehicle in the form of a single continuous image. That is, it generates a 2D plane image in the form of a top view that seems to be viewed from the upper end of the vehicle.

When a top view output apparatus using a plurality of cameras is applied to a bird's eye image, attention should be paid to installation so that the cameras basically use fisheye lenses having a field of view of about 180 degrees and thus common areas are ensured between neighboring cameras.

Conventional top view output apparatuses model ground plane information around a vehicle by combining algorithms, including lens distortion correction, pattern extraction, and the conversion of a point of view via homography, after images have been obtained from cameras in a tolerance correction process. These top view output apparatuses are systems that intuitively visualize information around a vehicle and continuously represent ground plane information, such as parking lines, around the vehicle over an omnidirectional range of 360 degrees around the vehicle.

However, the top view output apparatuses have several realistic limitations. First, the top view output apparatuses cannot guarantee the continuity of a ground object, other than a ground plane, because they do not take into consideration the continuity of a ground plane object. Furthermore, when images are synthesized, the distortion of a ground object is considerably increased because the top view output apparatus considers the ground object to be a ground plane object. As a result, a synthetic image displayed by the top view output apparatus appears to be a planar image that is somewhat different from a real image of the surroundings of a vehicle. Accordingly, the top view output apparatuses have low visibility with respect to a ground object.

Second, most of the currently developed top view output apparatuses represent a region of interest with a specific boundary set around a vehicle. The currently developed top view output apparatuses generally represent only an adjacent area, narrower than an area whose boundary is 2 m away from the front, back, and left and right sides of the vehicle, around a vehicle. If they represent an area wider than an area whose boundary is more than 2 m away from a vehicle, the degradation of image quality is serious and distortion is high, and thus it is difficult to apply them to practical use. In particular, the problem of the degradation of image quality occurs because information about a remote area in input images is significantly insufficient compared to that of a remote plane image whose representation is desired. Furthermore, if upon reverse parking, it is considered that a series of parking steps that are performed by a driver include the determination of the stopped and moving states of objects around a vehicle and the relative distances to the objects, the visual area actually supported by the top view output apparatuses may be viewed as too narrow to detect/determine the above-described elements. Accordingly, the top view output apparatuses have narrow visual areas.

Third, the distortion of a ground object, other than a plane, can be easily found in a synthetic image because the top view output apparatuses make information about the surroundings of a vehicle planar. This phenomenon caused by distortion in an algorithm is indispensable in terms of the characteristics of its principle. In particular, the phenomenon of the distortion of a ground object may become a critical problem when a driver interprets a synthetic image displayed via such an output apparatus. For example, if the synthesis device outputs a distorted image of an infant near a vehicle and a driver does not recognize an infant and drives the vehicle without taking any measures, fatal consequences may result. Accordingly, the top view output apparatuses perform impractical visualization over a wide range.

DISCLOSURE

Technical Problem

An object of the present invention is to provide, among vehicle assistance systems, an apparatus and method for synthesizing 3D images for the purpose of visualizing the surroundings of a vehicle, which compensate for the tolerance of cameras and synthesize a 3D image, in order to visualize images of the surroundings of a vehicle photographed using a plurality of cameras in the form of a 3D image.

Another object of the present invention is to provide an apparatus and method for synthesizing 3D images for the purpose of visualizing the surroundings of a vehicle, which synthesize all objects in ground and non-ground planes photographed using a plurality of cameras, thereby implementing a visualized image of information about the surroundings of a vehicle so that the visualized image has reality that is similar to that of a real one.

The objects that the present invention is intended to achieve are not limited to the above-described objects.

Technical Solution

In order to accomplish the above objects, the present invention provides an apparatus for synthesizing three-dimensional (3D) images, including an image input/output unit configured to receive photographed images of a reference pattern formed on a ground and a non-ground plane from a plurality of wide angle cameras mounted on a vehicle, and to output the photographed images; an image arrangement estimation unit configured to extract feature points from the reference patterns of the image input from the image input/output unit, and to estimate a relative location and installation angle of each of the cameras using known physical location information of the extracted feature points; a sphere mapping unit configured to obtain optical parameters for the correction of lens distortion including an optical center of a lens using the photographed images, and to map each of the images to a surface of a Gaussian sphere using obtained optical center; a virtual space arrangement unit configured to, using the relative location and installation angle of the camera estimated by the image arrangement estimation unit, change an angle and distance of the Gaussian sphere so that the Gaussian sphere coincides with the real reference patterns, and arrange the Gaussian spheres in a 3D virtual space; and a single image acquisition unit configured to obtain a single 3D image by mapping the images arranged in the 3D virtual space onto an inner surface of a 3D sphere corresponding to a single large sphere.

The image arrangement estimation unit may set information about the estimated relative location and installation angle of the camera.

The virtual space arrangement unit may use an optimization algorithm for estimating change parameters when changing the angle of rotation and distance of movement of the Gaussian sphere. The optimization algorithm may be particle swarm optimization (PSO), gradient descent (GD), or least mean square estimation (LMSE).

In order to map an image corresponding to the central portion of each of the images, the single image acquisition unit may divide the surface of the 3D sphere by the number of cameras, and may map only an image from the most adjacent camera.

The single image acquisition unit may divide the inner surface of the 3D sphere for individual longitudes based on the number of cameras, may divide one surface of the 3D sphere divided for the individual longitudes into ground and non-ground planes, and may perform mapping for individual latitudes.

In order to accomplish the above objects, the present invention provides a method of synthesizing 3D images, including receiving, by a plurality of wide angle cameras mounted on a vehicle, a plurality of images of reference patterns formed on a ground; extracting feature points from the photographed reference patterns, and estimating a relative location and installation angle of each of the cameras using known physical location information of the extracted feature points; obtaining optical parameters for the correction of lens distortion including an optical center of a lens using the photographed images, and mapping each of the images onto a surface of a Gaussian sphere using the obtained optical center; using the estimated relative location and installation angle of the camera, changing an angle and distance of the Gaussian sphere so that the Gaussian sphere coincides with the real reference patterns, and arranging the Gaussian spheres in a 3D virtual space; and obtaining a single 3D image by mapping the images arranged in the 3D virtual space onto an inner surface of a 3D sphere corresponding to a single large sphere.

Arranging the Gaussian spheres in the 3D virtual space may be performed by using an optimization algorithm, such as PSO, GD, and LMSE, in order to estimate change parameters when changing the angle of rotation and distance of movement of the Gaussian sphere.

Obtaining the single 3D image may include mapping the images arranged in the 3D virtual space onto areas of the inner surface of the 3D sphere most adjacent to a center of the 3D sphere.

Obtaining the single 3D image may include dividing the inner surface of the 3D sphere for individual longitudes based on a number of cameras in order to map images corresponding to central portions of the images; dividing the inner surface of the 3D sphere divided for the individual longitudes into ground and non-ground planes based on a latitude corresponding to the ground plane; and dividing the images arranged in the 3D virtual space into ground and non-ground planes, and performing mapping onto corresponding areas of the inner surface of the 3D sphere.

Advantageous Effects

As described above, the present invention is directed to a method and apparatus for synthesizing 3D images, which visualize information about the surroundings of a vehicle in the form of a 3D image. The present invention can enhance the visibility of objects around a vehicle because all objects located in ground and non-ground planes around the vehicle are represented in the form of a 3D image, and can improve the accuracy of the recognition of the objects around the vehicle because the objects are presented using a 3D image having low distortion.

Furthermore, the present invention can overcome a limitation in which the performance of homography used in the conventional synthesis method is unstable depending on the accuracy of the selection of patterns used in correction and replace a series of steps performed by homography only by adjusting three-axis rotation variables (phi, theta, psi), thereby ensuring the stability of operation of the system.

When an operator attempts to synthesize an image related to a vehicle under manufacture before factory shipment or a vehicle under repair using the apparatus for synthesizing 3D images according to the present invention, a desired image can be synthesized only by adjusting three-axis variables. Furthermore, even when an operator attempts a correction task in a space in which there are no reference patterns that satisfy predetermined conditions, a synthetic image can be corrected only by adjusting three-axis variables, and thus the present invention is advantageous in that operational convenience and scalability is excellent.

Moreover, a 3D space around a vehicle is modeled, thereby providing various angles of field for blind-zones that have been problematic.

DESCRIPTION OF DRAWINGS

FIG. 12 is a diagram illustrating a look-up table.

BEST MODE

Figure 1:
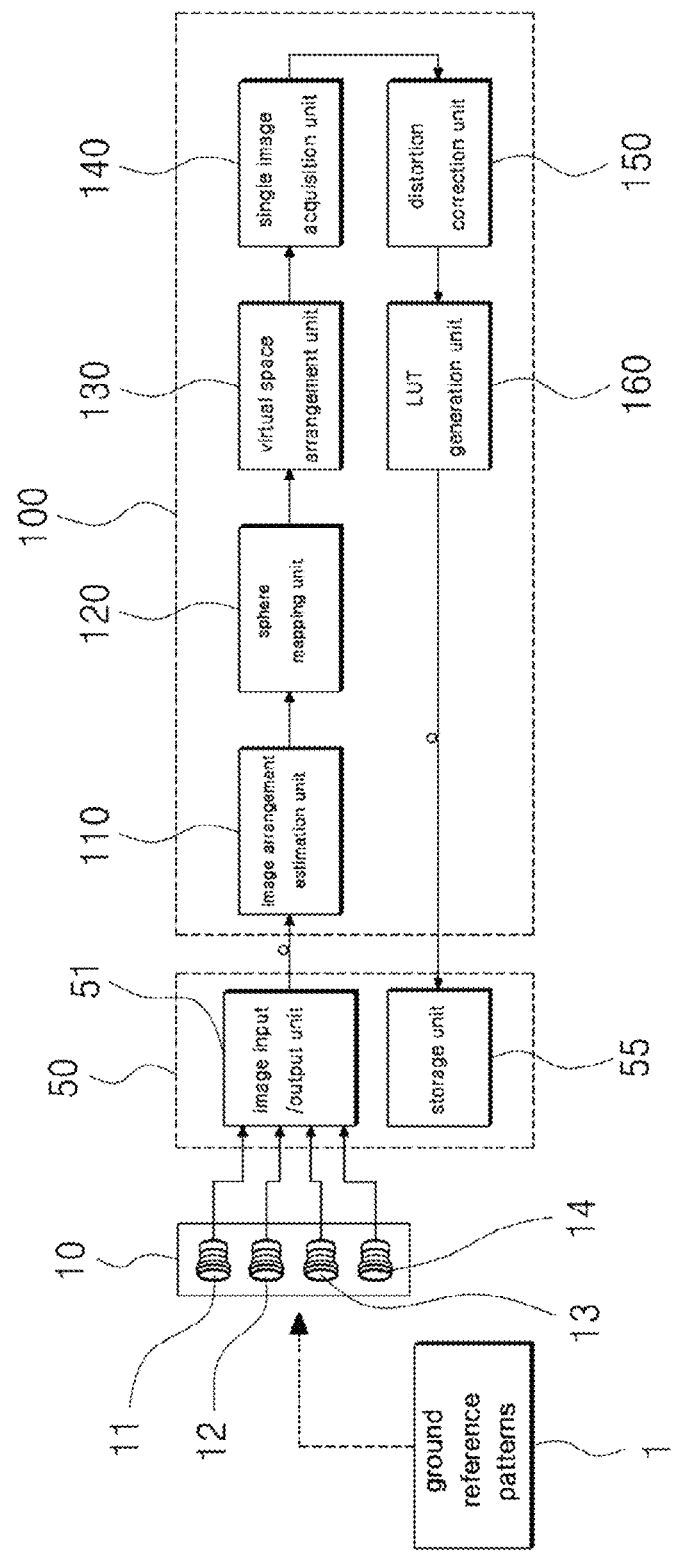
FIG. 1 is a diagram illustrating wide angle cameras and an apparatus for synthesizing 3D images according to an embodiment of the present invention.

Preferred embodiments of the present invention will be described in detail with reference to the accompanying drawings. The same components are designated by the same reference numerals throughout the accompanying drawings as much as possible. Furthermore, detailed descriptions of the well-known functions and configurations of the present invention that may make the gist of the present invention unnecessarily obscure will be omitted.

FIG. 1 is a diagram illustrating wide angle cameras and an apparatus for synthesizing 3D images according to an embodiment of the present invention, which includes a plurality of wide angle cameras 10, a 3D image output device 50, and an apparatus 100 for synthesizing 3D images.

Figure 2:
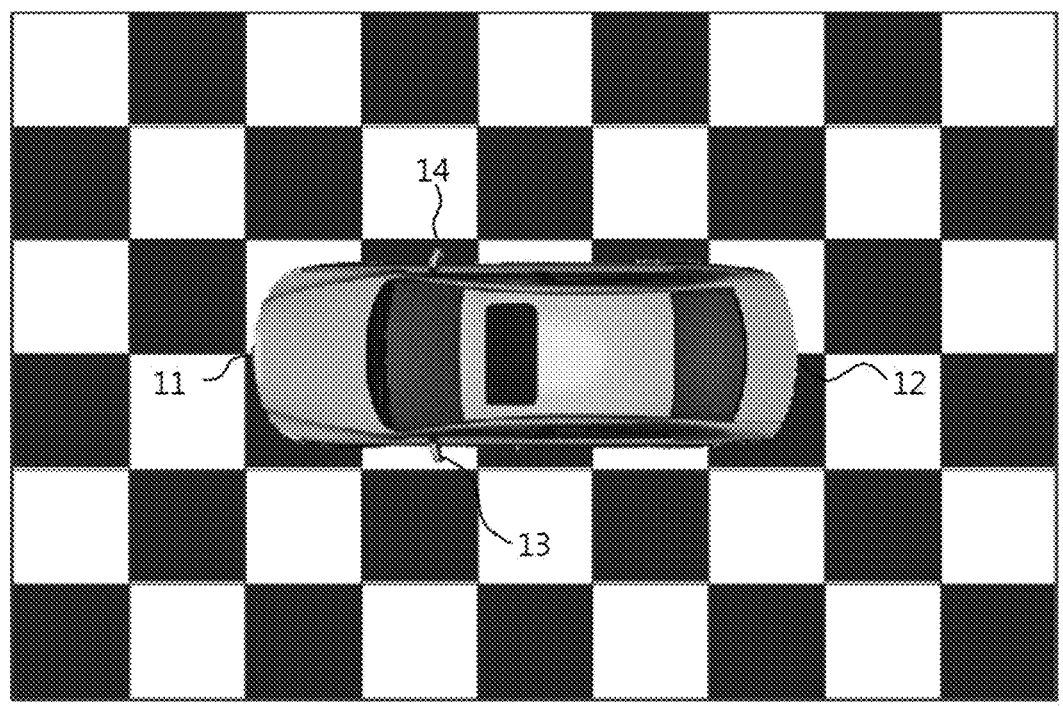
FIG. 2 is a diagram illustrating an example of reference patterns formed on the ground and a vehicle.

The wide angle cameras 10 include at least four wide angle cameras at any locations in front of, in back of, on the left of, and on the right of a vehicle. The wide angle cameras 10 photograph reference patterns 1 formed on the ground, as illustrated in FIG. 2, and a non-ground plane, convert the photographed images into electrical signals, and then transmit the electrical signals to the image input/output unit 51 of the 3D image output device 50. In this case, if the number of wide angle cameras 10 is, for example, four, it is preferred that the wide angle cameras 10 be arranged such that the coverage areas of neighboring wide angle cameras 10 overlap each other.

The wide angle cameras 10 are based on a concept including not only a simple optical instrument but also an electrical device, such as an image sensor configured to convert optical signals into electrical signals or the like. For example, if a target object is a vehicle, the wide angle cameras 10 may be arranged in front of, in back of, on the left and on the right of the vehicle, or on the corners of the vehicle, and the individual cameras 11, 12, 13, 14 may be arranged such that the coverage areas of neighboring cameras at least partially overlap each other. The wide angle cameras 10 use fisheye lenses in order to ensure angles of field. The reference patterns 1 are known patterns, and are installed on the ground on which fields of view can be ensured by the respective cameras. It is assumed that the physical location information of the feature points of the reference patterns 1 are known in advance. To ensure the visibility of the reference patterns 1, it is preferable to select as the color of each of the patterns a color having a high difference in brightness with respect to the color of the background of the ground.

The image input/output unit 51 of the 3D image output device receives photographed images of the reference patterns 1 formed on the ground and a non-ground plane from the plurality of wide angle cameras 10 mounted on the vehicle, and transmits the plurality of input images to the apparatus 100 for synthesizing 3D images. If necessary, the image input/output unit 51 may perform image preprocessing using a filter or the like. The image input/output unit 51 is part of the 3D image output device 50 mounted on the vehicle, and transmits the images input from the plurality of wide angle cameras 10 to the apparatus 100 for synthesizing 3D images.

The apparatus 100 for synthesizing 3D images stores algorithms configured to correct the plurality of images and synthesize them into 3D images. The apparatus 100 for synthesizing 3D images, as illustrated, may include an image arrangement estimation unit 110, a sphere mapping unit 120, a virtual space arrangement unit 130, a single image acquisition unit 140, a distortion correction unit 150, and an LUT generation unit 160.

The image arrangement estimation unit 110 extracts feature points from the reference patterns 1 photographed via the plurality of wide angle cameras 10, and estimates the relative location and installation angle of each of the cameras using the known physical location information of the extracted feature points. The image arrangement estimation unit 110 stores information about the estimated relative location and installation angle of the camera. That is, the image arrangement estimation unit 110 estimates only the relative location and inclined angle at which the camera is disposed based on the reference patterns 1 on the ground.

The sphere mapping unit 120 obtains optical parameters including the optical center of the lens for the correction of lens distortion using the images photographed via the wide angle cameras 10, and maps each of the images onto the surface of a Gaussian sphere using the obtained optical center. In this case, the optical parameters may include one or more of an optical center, aspect ratio, an image sensor, a projection type, and focal length.

The image sensor, the aspect ratio and the focal length may be obtained through the data sheet of the sensors, and the optical center may be determined based on the lens circle or center of an ellipse of the photographed image.

The correction of radial distortion may be viewed as being the same as pin-hole projection in that the refraction of the lens is eliminated. As projection equations, four projections equations, that is, an equidistant projection equation, an orthographic projection equation, an equisolid angle projection equation, and a stereographic projection equation, may be chiefly used.

Once the principal parameters used for the correction of lens distortion have been obtained as described above, each of the obtained images is mapped onto the Gaussian sphere using the obtained information.

Using the relative location and installation angle of the camera estimated by the image arrangement estimation unit 110, the virtual space arrangement unit 130 changes the angle and distance of the Gaussian sphere so that the Gaussian sphere coincides with the real reference patterns 1, and then arranges the Gaussian sphere in a 3D virtual space. The virtual space arrangement unit 130 may use an optimization algorithm for estimating change parameters when changing the angle of rotation and distance of movement of the Gaussian sphere. As the optimization algorithm, an optimization algorithm, such as particle swarm optimization (PSO), gradient descent (GD), and least mean square estimation (LMSE) or the like, may be used.

The single image acquisition unit 140 obtains a single 3D image by mapping the individual images arranged in the 3D virtual space onto the inner surface of a 3D sphere corresponding to a single large sphere. In order to map an image corresponding to the central portion of each of the images, the single image acquisition unit 140 divides the surface of the 3D sphere by the number of cameras, and maps only images from the most adjacent cameras. That is, the single image acquisition unit 140 divides the inner surface of the 3D sphere for respective longitudes based on the number of cameras, and divides one surface of the 3D sphere divided for individual longitudes into ground and non-ground planes and maps the ground and non-ground planes for respective latitudes. In this case, a mapping method for a ground plane and a mapping method for a non-ground plane may differ from each other in the 3D sphere.

In the image obtained via the single image acquisition unit 140, the distortion correction unit 150 corrects the radial distortion of a ground plane, that is, the central portion of the image, to a rectilinear form.

The LUT generation unit 160 generates a look-up table by associating the individual pixels of the synthetic image with the individual pixels of the input images. That is, the LUT generation unit 160 generates a mapping table defining the relationship in which the original coordinates of each pixel of the plurality of input images obtained via the plurality of wide angle cameras 10 have been mapped to the final coordinates of each pixel of the synthetic image.

The operation of the apparatus for synthesizing 3D images configured as described above will be described in greater detail with reference to the accompanying drawings.

Figure 3:
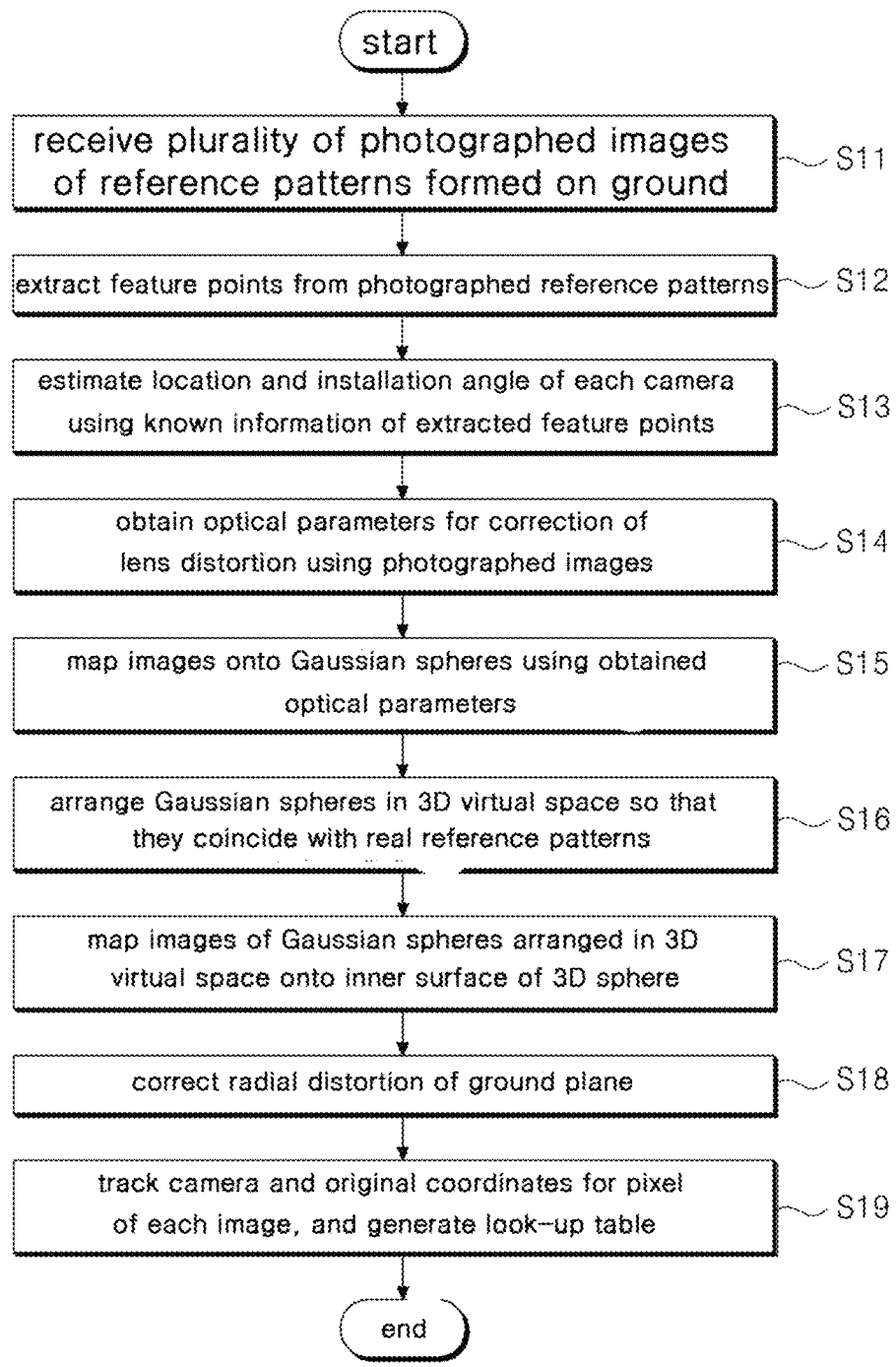
FIG. 3 is a flowchart illustrating a process of synthesizing 3D images according to an embodiment of the present invention.

FIG. 3 is a flowchart illustrating a process of synthesizing 3D images according to an embodiment of the present invention.

First, the known reference patterns 1 are installed on the ground, as illustrated in FIG. 2. It is assumed that in the reference patterns 1, the locations of the feature points (the intersections of the patterns) of the individual patterns and the distances between the feature points are known to the apparatus 100 for synthesizing 3D images in advance.

The 3D image output device 50 receives a plurality of images obtained when the plurality of wide angle cameras 10 mounted on the vehicle photographs the reference patterns 1 formed on the ground and transfers the images to the apparatus 100 for synthesizing 3D images at step S11.

Figure 4:
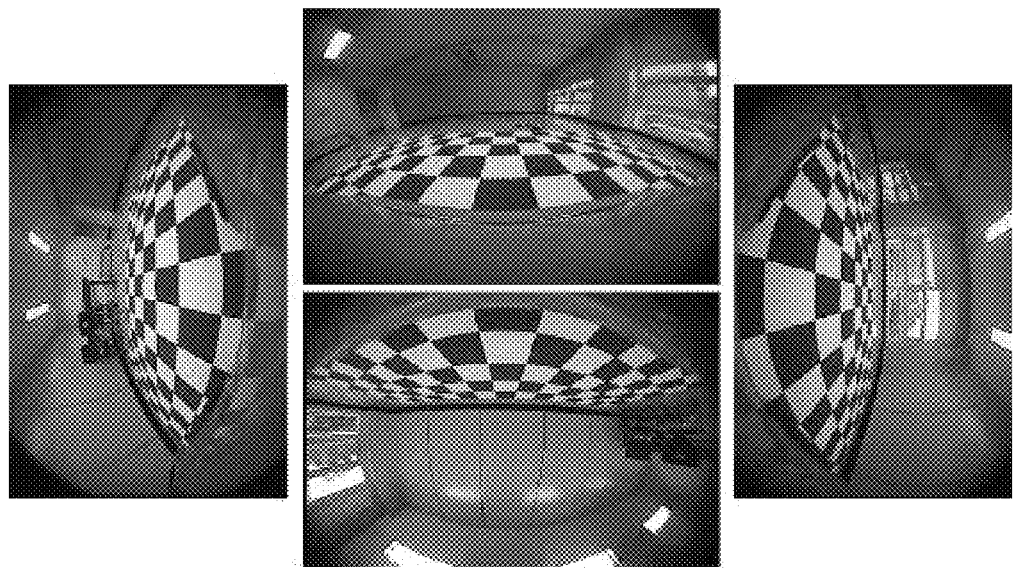
FIG. 4 is a diagram illustrating images input via a plurality of wide angle cameras.

Thereafter, the apparatus 100 for synthesizing 3D images extracts the feature points of the reference patterns 1 from the images photographed, as shown in FIG. 4, and estimates the relative location and installation angle of each of the cameras using the known physical location information of the extracted feature points at steps S12 and S13. In this case, the apparatus 100 for synthesizing 3D images stores information about the estimated relative location and installation angle of the camera. That is, the apparatus 100 for synthesizing 3D images estimates only the relative location and inclined angle at which the camera is disposed based on the reference patterns 1 of the ground.

After estimating the relative location and installation angle of the camera, the apparatus 100 for synthesizing 3D images obtains optical parameters including the optical center of a lens for the correction of lens distortion using the photographed images and maps each of the images onto the surface of a Gaussian sphere using the obtained optical parameters at steps S14 and S15. In this case, the optical parameters may include one or more of an optical center, aspect ratio, an image sensor, a projection type and focal length.

The correction of radial distortion may be viewed as being the same as pin-hole projection in that the refraction of a lens is eliminated. As projection equations, four projections equations, that is, an equidistant projection equation, an orthographic projection equation, an equisolid angle projection equation, and a stereographic projection equation, as shown in Equation 1, may be chiefly used. In Equation 1, $R_f$ is a projected distance in an image plane, f is a focal length, and φ is the incident angle of an incident ray. Alternative, various equations may be used.

$$\text{Equidistance projection: } R_f = f \cdot \varphi \quad (1)$$
$$\text{Orthographic projection: } R_f = f \cdot \sin(\varphi)$$
$$\text{Equisolid projection: } R_f = 2f \cdot \sin\left(\frac{\varphi}{2}\right)$$
$$\text{Stereographic projection: } R_f = 2f \cdot \tan\left(\frac{\varphi}{2}\right)$$

Figure 5:
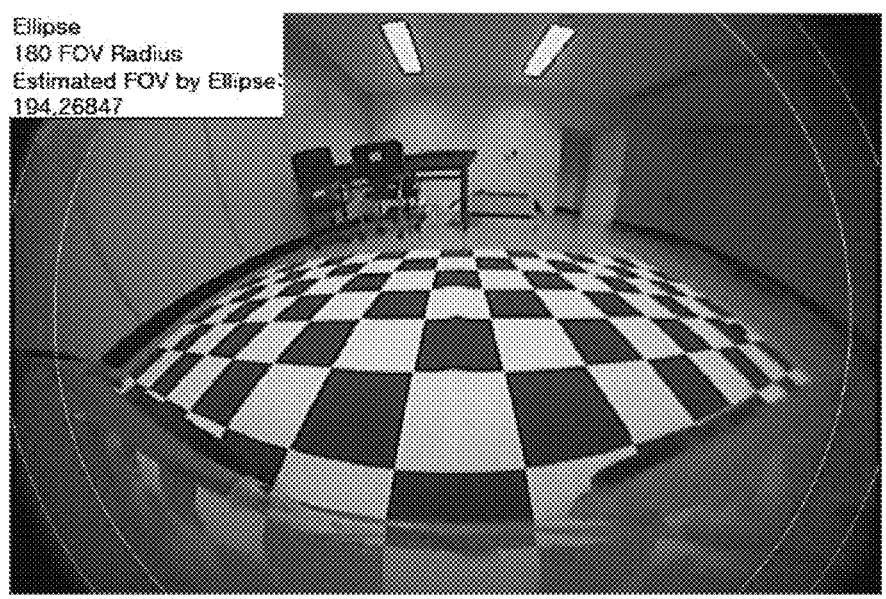
FIG. 5 is an image illustrating the acquisition of an optical parameter using an input image.

Meanwhile, the aspect ratio of an image sensor, which is a principal parameter for the correction of camera distortion, can be obtained from the data sheet of image sensors. In another method, the aspect ratio may be obtained in a process of estimating an elliptical shape, that is, the shape of the lens circle of an image photographed as shown in FIG. 5, and converting it into a circular shape.

The optical center may be considered to be the center of the lens circle or ellipse of the corresponding photographed image.

The focal length may be obtained based on values given upon manufacturing and the data sheet of the image sensors. In another method, the focal length may be defined as a focal length value in the case where a rectilinear line appears without distortion when the distortion of an image has been eliminated in accordance with the projection equations, and thus the focal length may be obtained by estimating the focal length value.

Figure 6:
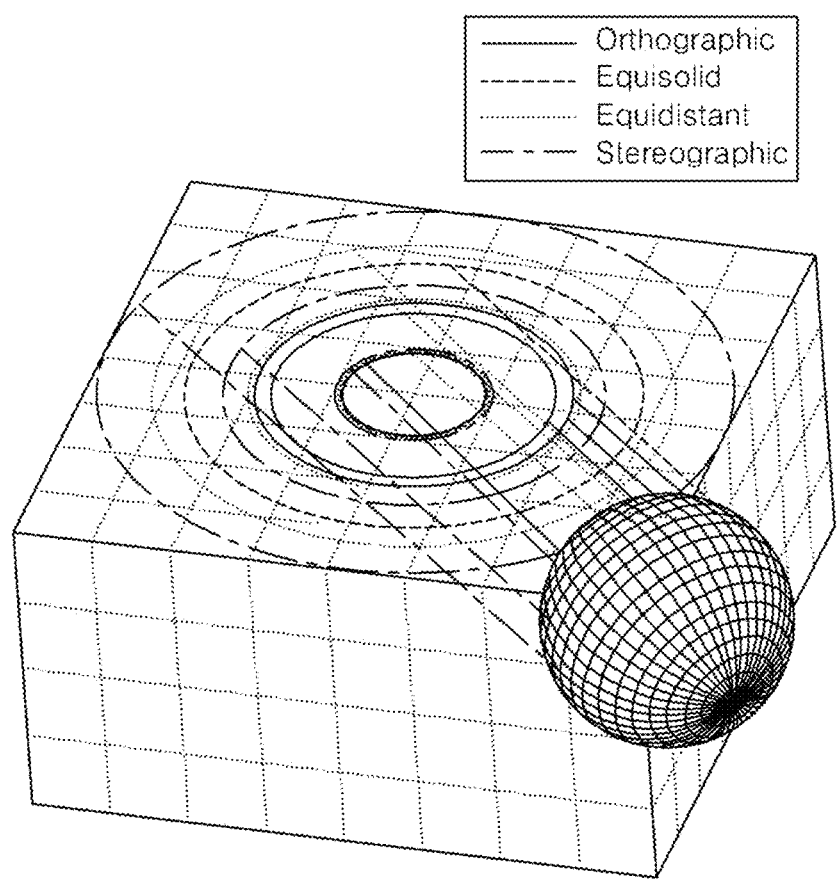
FIG. 6 is a diagram illustrating Gaussian sphere mapping.

Once the principal parameters used to correct lens distortion have been determined as described above, each of the images is mapped onto a Gaussian sphere using the obtained information, as illustrated in FIG. 6. FIG. 6 illustrates various types of Gaussian sphere mapping methods based on projection types. The different types of lines have been used to distinguish the various projection types.

After mapping each of the images onto the Gaussian sphere as described above, the apparatus 100 for synthesizing 3D images changes the angle and distance of the Gaussian sphere so that the Gaussian sphere coincides with the real reference patterns 1, and then arranges the Gaussian sphere in a 3D virtual space, using the estimated relative location and installation angle of the camera at step 16. In this case, an optimization algorithm for estimating change parameters when changing the angle of rotation and distance of movement of the Gaussian sphere may be used. As the optimization algorithm, an optimization algorithm, such as particle swarm optimization (PSO), gradient descent (GD), or least mean square estimation (LMSE), may be used.

The process of performing arrangement in a 3D virtual space as described above includes estimating locations and angles at which Gaussian spheres representative of respective cameras are disposed based on the reference patterns 1 of the ground and then arranging the Gaussian spheres in a virtual space using the estimated values. The Gaussian spheres are arranged in a virtual 3D space, and represent the real cameras mounted on a vehicle. The process of performing estimation is performed by varying the angle of rotation and the distance of movement in a direction that increases the coincidence with the real reference patterns 1 when each of the Gaussian spheres is rotated and moved and then an image mapped onto the Gaussian sphere is mapped onto the ground. Each of the Gaussian spheres may be mapped to the real reference patterns 1 using the following Equation 2:

$$XY_p = f_{pc} \cdot (S_c \cdot R(\psi) \cdot R(\theta) \cdot R(\phi))(XY_c) \quad (2)$$

In this equation, $XY_c$ is the rectangular coordinates of a point on the surface of a sphere when the center of a Gaussian sphere is set as an origin and may be represented by $(X_c, Y_c, Z_c)$, and $XY_p$ is the 2D coordinates of a point at which $XY_c$ is mapped onto the ground. $S_c$ is a multiplier that is used to increase/reduce the radius of the Gaussian sphere, $f_{pc}$ is a function that maps 3D coordinates to a point in a plane, and $R(\phi)$, $R(\theta)$ and $R(\psi)$ may be represented by rotation matrices of 3D coordinates, as expressed in the following Equation 3. If the point of view of the camera is defined as an y axis, a direction orthogonal thereto is defined as an x axis and a direction vertical to the vehicle is defined as a z axis, φ is an angle at which rotation has been made around the x axis, θ is an angle at which rotation has been made around the y axis, and ψ is an angle at which rotation has been made around the z axis.

$$R(\phi) = \begin{pmatrix} 1 & 0 & 0 \\ 0 & \cos\phi & \sin\phi \\ 0 & -\sin\phi & \cos\phi \end{pmatrix}, \quad (3)$$

$$R(\theta) = \begin{pmatrix} \cos\theta & 0 & -\sin\theta \\ 0 & 1 & 0 \\ \sin\theta & 0 & \cos\theta \end{pmatrix},$$

$$R(\psi) = \begin{pmatrix} \cos\phi & \sin\phi & 0 \\ -\sin\phi & \cos\phi & 0 \\ 0 & 0 & 1 \end{pmatrix}$$

When both of Equations 2 and 3 are expanded, the following Equation 4 is obtained. In this case, $X_{pd}$ represents the distance along which the Gaussian sphere has moved in the x-axis direction, and $Y_{pd}$ represents the distance along which the Gaussian sphere has moved in the y-axis direction.

$$X_p = \pm S_c \sqrt{X_c^2 + Y_c^2 + Z_c^2} \cdot \qquad (4)$$
$$= \begin{pmatrix} (X_c(\cos\theta\cos\psi) + Y_c(\cos\theta\sin\psi) + Z_c(-\sin\theta)) \\ \overline{(X_c(\sin\phi\sin\psi) + \cos\phi\sin\theta\cos\psi) +} \\ Y_c(-\sin\phi\cos\psi + \cos\phi\sin\theta\sin\psi) + Z_c(\cos\phi\cos\theta) \end{pmatrix} + X_{pd}$$

$$X_p = \pm S_c \sqrt{X_c^2 + Y_c^2 + Z_c^2} \cdot$$
$$= \begin{pmatrix} (X_c(-\cos\phi\sin\psi + \sin\phi\sin\theta\cos\psi) + \\ Y_c(\cos\phi\cos\psi + \sin\phi\sin\theta\sin\psi) + Z_c(\sin\phi\cos\theta) \\ \overline{(X_c(\sin\phi\sin\psi) + \cos\phi\sin\theta\cos\psi) +} \\ Y_c(-\sin\phi\cos\psi + \cos\phi\sin\theta\sin\psi) + Z_c(\cos\phi\cos\theta) \end{pmatrix} + Y_{pd}$$

After pattern matching has been performed using Equations 2 to 4, a particle swarm optimization (PSO) algorithm may be applied using a method of changing the angle of rotation and the distance of movement.

Figure 7:
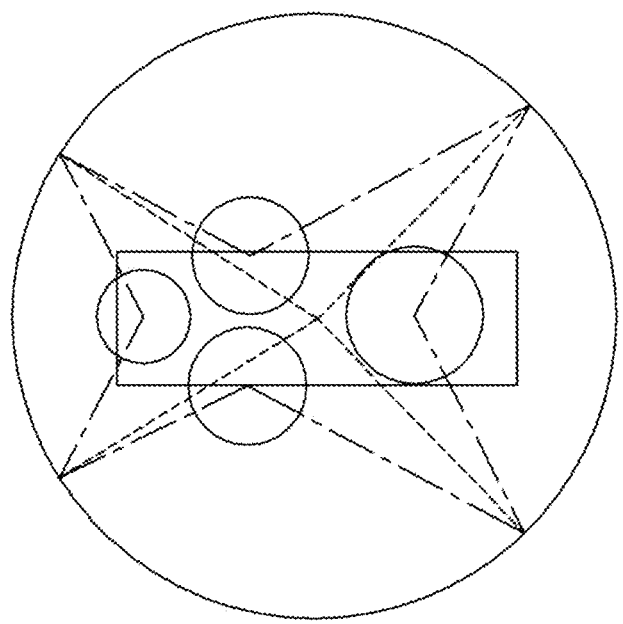
FIG. 7 is a diagram illustrating division for respective longitudes upon mapping Gaussian spheres into a 3D sphere.

After the Gaussian spheres have been arranged in the 3D virtual space, the apparatus 100 for synthesizing 3D images maps the images arranged in the 3D virtual space onto the inner surface of a 3D sphere single corresponding to a large sphere, thereby obtaining a single 3D image at step S17. When the images are mapped onto the inner surface of the 3D sphere, the images of the respective Gaussian spheres arranged in the 3D virtual space may be mapped onto areas of the inner surface of the 3D sphere most adjacent to the center of the 3D sphere. The apparatus 100 for synthesizing 3D images divides the inner surface of the 3D sphere for individual longitudes based on the number of cameras in order to map an image corresponding to the central portion of each of the images, as illustrated in FIG. 7. If the number of wide angle cameras 10 is four, the inner surface of the 3D sphere is divided into four areas for respective longitudes. In FIG. 7, the rectangle inside the 3D sphere represents a vehicle, and the small circles located in front of, in back of, on the left of and on the right of the rectangle represents the cameras. In this case, alternative long and short dash lines represent the fields of views (FOVs) of the wide angle cameras 10, and the dotted lines represent seam lines indicative of the boundaries between the adjacent cameras. That is, the image of each of the cameras will be mapped to the most adjacent area of the 3D sphere that is divided for individual longitudes. The reason why the 3D sphere is divided for individual longitudes as described above is to map only an image corresponding to the central portion of the image from each of the wide angle cameras 10 because distortion rate is high in the outer portion of the image.

Figure 8:
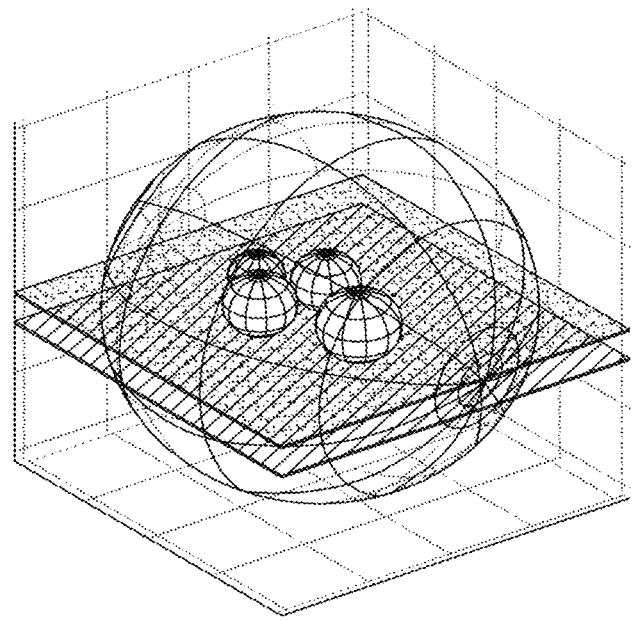
FIGS. 8 and 9 are diagrams illustrating the mapping of a ground plane and a non-ground plane upon mapping Gaussian spheres into a 3D sphere.

The apparatus 100 for synthesizing 3D images divides the inner surface of the 3D sphere divided for individual longitudes into ground and non-ground planes based on a latitude corresponding to the ground plane, as illustrated in FIG. 8. In FIG. 8, the lower rectangular plate (hatched) represents a ground plane, and the upper rectangular plate (dotted) represents a surface that connects the central portions of Gaussian spheres. Images representative of the non-ground plane are mapped onto the hemisphere above the upper rectangular plate. The individual images arranged in the 3D virtual space are divided for the ground and non-ground planes, and then mapped onto the corresponding inner surface of the 3D sphere. In this case, methods of mapping images onto the ground and non-ground planes of a 3D sphere may differ from each other in order to implement a 3D image.

If the overall 3D area is assigned using the mapping method for a non-ground plane, an image of the surroundings of a real vehicle is also represented to be close to a circle, which becomes an obstacle to the intuitive understanding of the surrounds of a user. Accordingly, the more effect visualization of the surroundings of a vehicle can be achieved by mapping images with respect to the adjacent surroundings of a vehicle in a top view manner. For this reason, mapping for a ground plane assumed to be an adjacent area and mapping for a non-ground plane assumed to be a remote area are performed in different manners.

Figure 9:
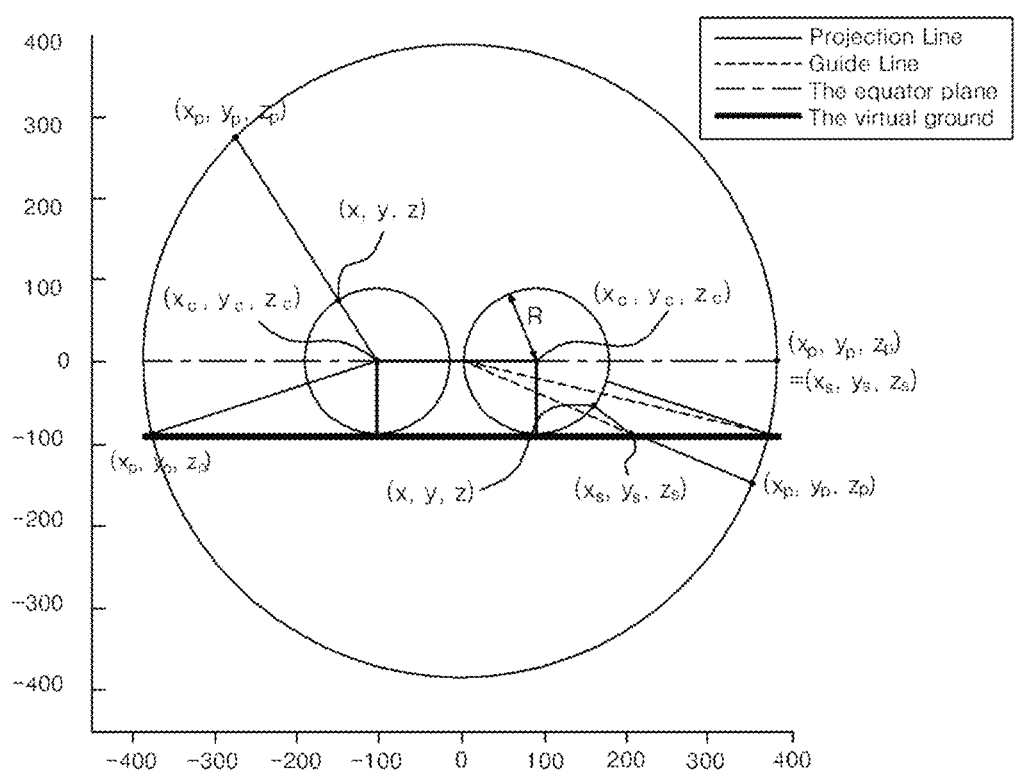

For example, when the ground plane of the 3D sphere is mapped, as illustrated in FIG. 9, a point $(x_p, y_p, z_p)$ of the 3D sphere may be brought from a point of the most adjacent Gaussian sphere and may be mapped onto the 3D sphere, using a method of calculating T of the following Equation 5 and then obtaining x,y,z. In FIG. 9, the right Gaussian sphere is a sphere represented to illustrate the mapping of the ground plane, and the left Gaussian sphere is a sphere represented to illustrate the mapping of the non-ground plane.

$$x_x = x_p \cdot z_s / z_p \qquad (5)$$
$$y_s = y_p \cdot z_s / z_p$$
$$x = x_c + T(x_s - x_c)$$
$$y = y_c + T(y_s - y_c)$$
$$z = z_c + T(z_s - z_c)$$
$$(x - x_c)^2 + (y - y_c)^2 + (z - z_c)^2 = R^2$$
$$T = \frac{R}{\sqrt{(x_s - x_c)^2 + (y_s - y_c)^2 + (z_s - z_c)^2}}$$

In this case, (x,y,z) are the coordinates of a point on the surface of a Gaussian sphere that is mapped to a point $(x_s, y_s, z_s)$ in a ground plane, and $(x_c, y_c, z_c)$ represents the center of the Gaussian sphere. R represents the radius of the Gaussian sphere.

Meanwhile, when the non-ground plane of the 3D sphere is mapped, a point $(x_p, y_p, z_p)$ of the 3D sphere may be brought from a point of the most adjacent Gaussian sphere and may be mapped onto the 3D sphere, using a method of calculating T of the following Equation 6 and then obtaining x,y,z.

$$x = x_c + T(x_p - x_c)$$
$$y = y_c + T(y_p - y_c)$$
$$z = z_c + T(z_p - z_c)$$
$$T = \frac{R}{\sqrt{(x_p - x_c)^2 + (y_p - y_c)^2 + (z_p - z_c)^2}}$$
(6)

In this case, (x,y,z) are the coordinates of a point on the surface of a Gaussian sphere that is mapped to a point $(x_p, y_p, z_p)$ in a non-ground plane, $(x_c, y_c, z_c)$ represents the center of the Gaussian sphere, and R represents the radius of the Gaussian sphere.

Figure 10:
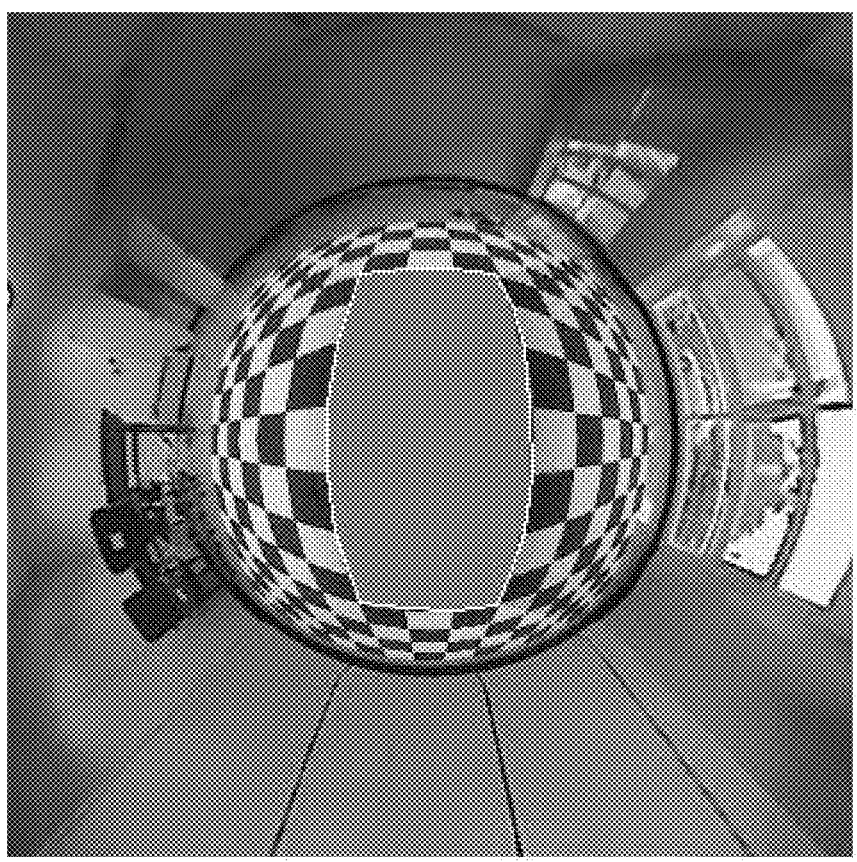
FIG. 10 is a diagram illustrating a 3D single synthetic image.

Through the above-described process, a single 3D image, such as that of FIG. 10, is obtained.

Figure 11:
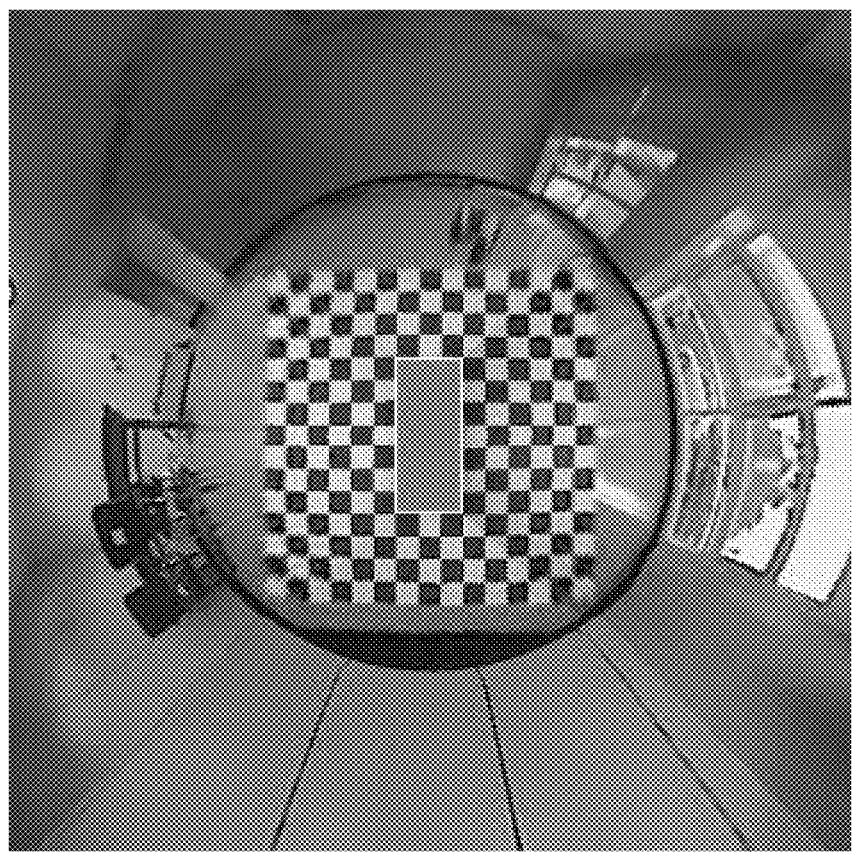
FIG. 11 is an image in which the distortion of the adjacent (ground plane) area of FIG. 10 has been corrected.

For the single 3D image generated as described above, the apparatus 100 for synthesizing 3D images corrects the radial distortion of a ground plane, that is, the central portion of the image, to a rectilinear form, such as that of FIG. 11, at step S19. In the single 3D image, reference patterns, that is, a ground plane, are curved, as illustrated in FIG. 10, and thus it is necessary to correct the curved reference patterns to rectilinear forms.

The correction of distortion is generally intended to eliminate a lens distortion phenomenon attributable to a difference in curvature by performing inverse operation on the curvature of a lens in a camera using a wide angle lens, other than a pinhole camera, and making incident points uniform around the optical center based on the results of the reverse operation. Accordingly, in the process of correcting distortion, when a model equation (a projection equation) for the curvature of a lens is given, the degree of distortion is determined based on the equation, and only perspective distortion in an image remains after the correction step.

After correcting the distortion of the 3D image, the apparatus 100 for synthesizing 3D images generates a look-up table by tracking cameras and original coordinates for the pixels of each image at step S20.

The look-up table is a means for storing image mapping data about the relationship in which each pixel of the plurality of input images obtained from the plurality of wide angle cameras 10 has been mapped to each pixel of the synthetic image, for example, and may be configured in the form of that shown in FIG. 12.

Referring to FIG. 12, the look-up table may be considered to be a kind of mapping table that defines the relationship in which the original coordinates (x,y) of the pixels of the plurality of input images obtained from the plurality of wide angle cameras 10 have been mapped to the final coordinates (t11, t12, . . . , tmn) of the pixels of the synthetic image. Each of the final coordinates (t11, t12, . . . , tmn) of the synthetic image may be mapped to a plurality of input images. The reason for this is that when the images obtained from the wide angle cameras 10 are mapped to a planar image, there are cases where each pixel of the images is mapped in an N:1 correspondence, other than an 1:1 correspondence, because the images are distorted images having wide angles of field as described above. For example, the final coordinate T11 may be mapped to three pairs of input original coordinates $(x_1,y_2)$, $(x_3,y_5)$, and $(x_4,y_6)$. A number of look-up tables equal to the number of input images obtained from the wide angle cameras 10 are provided, and corresponding coordinate values of the synthetic image are included for each of the input images.

In the process of generating such a look-up table, when the inverse operation of a required operation is performed in order to obtain output for each pixel of a sample synthetic image to generate the look-up table, the coordinates of each pixel of the input images corresponding to each pixel of the synthetic image can be obtained.

In the process of generating such a look-up table, for example, any one pixel is selected from among pixels that constitute the 3D synthetic image. The pixel is selected based on its coordinates, and the coordinates become a final coordinate of the synthetic image.

Once the pixel has been selected, one of the plurality of wide angle cameras 10 that generated the selected pixel is determined. This may be viewed as the reverse process of the synthesis process. In order to determine one of the plurality of wide angle cameras 10 that generated the selected pixel, it may be convenient to use a method of adding identifiers capable of identifying the plurality of wide angle cameras 10 to the input images generated by the cameras 10 and then checking the identifiers later.

Once the above process has been performed, the original coordinates of the final coordinates of a selected pixel in the input image obtained by the camera may be determined. Accordingly, original coordinates corresponding to the final coordinates of a specific pixel are obtained and recorded.

Original coordinates corresponding to the final coordinates of any pixel may be obtained by sequentially performing this process on all the pixels of the synthetic image.

A look-up table (LUT), such as that of FIG. 12, may be generated by mapping original coordinates obtained using the above-described method to the final coordinates of corresponding pixels. In this case, all the pixels of the input images are not mapped to the final coordinates of the synthetic image. This means that unnecessary pixels of the input images may not be mapped to final coordinates and may be discarded. Generally, since only pixels in a specific area of each of the input images, that is, only 20% to 50% pixels, are converted into the synthetic image, the mapping process is performed only on the pixels of the input images converted into the synthetic image while referring to the look-up tables, and thus load and time can be reduced upon image processing.

After generating look-up tables, such as that that of FIG. 12, the apparatus 100 for synthesizing 3D images transmits the generated look-up tables to the 3D image output device 50 mounted on the vehicle, thereby installing the look-up tables in the storage unit 55. Thereafter, the vehicle directly maps pixels of images, such as that of FIG. 4, input via the plurality of wide angle cameras 10 upon real parking or driving, onto the final synthetic image while referring to the look-up tables stored in storage unit 55 without performing the synthesis process of the present invention, thereby simply and rapidly generating and displaying a 3D surrounding image, such as that of FIG. 11.

Accordingly, in the present invention, it is possible to convert a point of view using only three-axis rotation for a 3D object based on 3D information that is generated while a plurality of cameras is being projected onto a single virtual camera, without using a homographic viewpoint conversion algorithm, which is a conventional spatial transformation method. The present invention is characterized in that both ground plane and non-ground plane information can be synthesized by performing image synthesis based on the 3D modeling of a space around a vehicle.

The apparatus and method for synthesizing 3D images are not limited to the configuration and operation of the above-described embodiments. The above-described embodiments may be configured such that all or some of the embodiments are selectively combined, thereby making various modifications.

The invention claimed is:

1. An apparatus for synthesizing three-dimensional (3D) images, comprising:
   an image input/output unit configured to receive photographed images of a reference pattern formed on a ground and a non-ground plane from a plurality of wide angle cameras mounted on a vehicle, and to output the photographed images;
   an image arrangement estimation unit configured to extract feature points from the reference patterns of the image input from the image input/output unit, and to estimate a relative location and installation angle of each of the cameras using known physical location information of the extracted feature points;
   a sphere mapping unit configured to obtain optical parameters for correction of lens distortion including an optical center of a lens using the photographed images, and to map each of the images to a surface of a Gaussian sphere using obtained optical center;
   a virtual space arrangement unit configured to, using the relative location and installation angle of the camera estimated by the image arrangement estimation unit, change an angle and distance of the Gaussian sphere so that the Gaussian sphere coincides with the real reference patterns, and arrange the Gaussian spheres in a 3D virtual space; and
   a single image acquisition unit configured to obtain a single 3D image by mapping the images arranged in the 3D virtual space onto an inner surface of a 3D sphere corresponding to a single large sphere.

2. The apparatus of claim 1, wherein the image arrangement estimation unit sets information about the estimated relative location and installation angle of the camera.

3. The apparatus of claim 1, wherein the optical parameters comprise one or more of an optical center, aspect ratio, an image sensor, a projection type and focal length.

4. The apparatus of claim 1, wherein the virtual space arrangement unit uses an optimization algorithm for estimating change parameters when changing an angle of rotation and distance of movement of the Gaussian sphere.

5. The apparatus of claim 4, wherein the optimization algorithm is any one of particle swarm optimization (PSO), gradient descent (GD), and least mean square estimation (LMSE).

6. The apparatus of claim 1, wherein the single image acquisition unit, in order to map an image corresponding to a central portion of each of the images, divides the surface of the 3D sphere by a number of cameras, and maps only an image from a most adjacent camera.

7. The apparatus of claim 1, wherein the single image acquisition unit divides the inner surface of the 3D sphere for individual longitudes based on a number of cameras, divides one surface of the 3D sphere divided for the individual longitudes into ground and non-ground planes, and performs mapping for individual latitudes.

8. The apparatus of claim 7, wherein mapping methods for ground and non-ground planes differ from each other in the 3D sphere.

9. A method of synthesizing 3D images, comprising:
   receiving, by a plurality of wide angle cameras mounted on a vehicle, a plurality of images of reference patterns formed on a ground;
   extracting feature points from the photographed reference patterns, and estimating a relative location and installation angle of each of the cameras using known physical location information of the extracted feature points;
   obtaining optical parameters for correction of lens distortion including an optical center of a lens using the photographed images, and mapping each of the images onto a surface of a Gaussian sphere using the obtained optical center;
   using the estimated relative location and installation angle of the camera, changing an angle and distance of the Gaussian sphere so that the Gaussian sphere coincides with the real reference patterns, and arranging the Gaussian spheres in a 3D virtual space; and
   obtaining a single 3D image by mapping the images arranged in the 3D virtual space onto an inner surface of a 3D sphere corresponding to a single large sphere.

10. The method of claim 9, wherein arranging the Gaussian spheres in the 3D virtual space is performed by using any one of PSO, GD, and LMSE algorithms in order to estimate change parameters when changing the angle of rotation and distance of movement of the Gaussian sphere.

11. The method of claim 9, wherein arranging the Gaussian spheres in the 3D virtual space comprises performing matching with the real reference patterns using the following equation:

$$XY_p = f_{pc} \cdot (S_c \cdot R(\psi) \cdot R(\theta) \cdot R(\phi))(XY_c)$$

where $$R(\phi) = \begin{pmatrix} 1 & 0 & 0 \\ 0 & \cos\phi & \sin\phi \\ 0 & -\sin\phi & \cos\phi \end{pmatrix},$$

$$R(\theta) = \begin{pmatrix} \cos\theta & 0 & -\sin\theta \\ 0 & 1 & 0 \\ \sin\theta & 0 & \cos\theta \end{pmatrix},$$

$$R(\psi) = \begin{pmatrix} \cos\phi & \sin\phi & 0 \\ -\sin\phi & \cos\phi & 0 \\ 0 & 0 & 1 \end{pmatrix},$$

where $XY_p$ is a point on the inner surface of the sphere, $XY_c$ is rectangular coordinates of a point on the inner surface of the sphere when a center of the Gaussian sphere is set as an origin, $S_c$ is a multiplier that is used to increase/reduce a radius of the Gaussian sphere, $f_{pc}$ is a function that maps 3D coordinates to a point in a plane, $R(\phi)$, $R(\theta)$ and $R(\psi)$ are rotation matrices of 3D coordinates, $\phi$ is an angle at which rotation has been made around an x axis, $\theta$ is an angle at which rotation has been made around an y axis, and $\psi$ is an angle at which rotation has been made around an z axis.

12. The method of claim 9, wherein obtaining the single 3D image comprises mapping the images arranged in the 3D virtual space onto areas of the inner surface of the 3D sphere most adjacent to a center of the 3D sphere.

13. The method of claim 9, wherein obtaining the single 3D image comprises:

dividing the inner surface of the 3D sphere for individual longitudes based on a number of cameras in order to map images corresponding to central portions of the images;

dividing the inner surface of the 3D sphere divided for the individual longitudes into ground and non-ground planes based on a latitude corresponding to the ground plane; and dividing the images arranged in the 3D virtual space into ground and non-ground planes, and performing mapping onto corresponding areas of the inner surface of the 3D sphere.

14. The method of claim 13, wherein performing the mapping is performed by using different mapping methods for the ground and non-ground planes.

15. The method of claim 13, wherein performing the mapping comprises, when performing mapping onto the ground plane of the 3D sphere, bringing a point $(x_p, y_p, z_p)$ of the 3D sphere from a point of a most adjacent Gaussian sphere and mapping the point $(x_p, y_p, z_p)$ of the 3D sphere onto the 3D sphere, using a method of calculating T of the following equation and then obtaining x,y,z:

$$x_x = x_p \cdot z_s/z_p$$
$$y_s = y_p \cdot z_s/z_p$$
$$x = x_c + T(x_s - x_c)$$
$$y = y_c + T(y_s - y_c)$$
$$z = z_c + T(z_s - z_c)$$
$$(x - x_c)^2 + (y - y_c)^2 + (z - z_c)^2 = R^2$$

$$T = \frac{R}{\sqrt{(x_s - x_c)^2 + (y_s - y_c)^2 + (z_s - z_c)^2}}$$

where (x,y,z) are coordinates of a point on the surface of the Gaussian sphere that is mapped to a point $(x_s, y_s, z_s)$ in the ground plane, $(x_c, y_c, z_c)$ represents the center of the Gaussian sphere, and R represents a radius of the Gaussian sphere.

16. The method of claim 13, wherein performing the mapping comprises, when performing mapping onto the ground plane of the 3D sphere, bringing a point $(x_p, y_p, z_p)$ of the 3D sphere from a point of a most adjacent Gaussian sphere and mapping the point $(x_p, y_p, z_p)$ of the 3D sphere onto the 3D sphere, using a method of calculating T of the following equation and then obtaining x,y,z:

$$x = x_c + T(x_p - x_c)$$
$$y = y_c + T(y_p - y_c)$$
$$z = z_c + T(z_p - z_c)$$
$$T = \frac{R}{\sqrt{(x_p - x_c)^2 + (y_p - y_c)^2 + (z_p - z_c)^2}}$$

where (x,y,z) are coordinates of a point on the surface of the Gaussian sphere that is mapped to a point $(x_s, y_s, z_s)$ in the ground plane, $(x_c, y_c, z_c)$ represents the center of the Gaussian sphere, and R represents a radius of the Gaussian sphere.

* * * * *